United States Patent Office 2,732,282
Patented Jan. 24, 1956

2,732,282

DISPROPORTIONATION OF CHLOROSILANES EMPLOYING NITRILE CATALYSTS

Donald L. Bailey, Snyder, Paul W. Shafer, Niagara Falls, and George H. Wagner, Clarence, N. Y., assignors to Union Carbide and Carbon Corporation, a corporation of New York No Drawing. Application March 25, 1953, Serial No. 344,684

21 Claims. (Cl. 23—14)

This invention relates to those compounds normally termed chlorosilanes and, more particularly, to the production of such compounds by a new and improved process.

The widely known methods for the production of chlorosilanes yield, in general, a trichlorosilane as the principal product. In such methods, however, there is also obtained minor proportions of other compounds, including monochloro- and dichlorosilanes. The latter compounds have been found particularly useful in numerous syntheses and, therefore, considerable attention has been directed toward their production. Heretofore, efforts to obtain such compounds have been for the most part directed either toward modifying the well-known reactions which yield a trichlorosilane or by reacting a trichlorosilane with other compounds whereby one or more chlorine atoms are removed. Production of monochloro- and dichlorosilanes by either of the above methods has not proven entirely satisfactory and, consequently, the need for an improved method exists.

In its broadest aspects, the invention permits in an assemblage of chlorosilane molecules a redistribution of particular atoms connected to silicon. Such redistribution may be termed a disproportionation of the molecule whereby a rearrangement of the atoms is accomplished. It has been found that the method of our invention effects disproportionation of only those chlorosilane molecules containing at least one hydrogen to silicon bond. In each instance where disproportionation occurs, the redistribution affects only those hydrogen and chlorine atoms which are bonded to a silicon atom. For example, trichlorosilane, HSiCl$_3$, may be disproportionated whereby a rearrangement of hydrogen and chlorine atoms occurs to yield dichlorosilane, H$_2$SiCl$_2$, and silicon tetrachloride, SiCl$_4$. Dichlorosilane, H$_2$SiCl$_2$, may also be disproportionated and yields monochlorosilane, H$_3$SiCl, and trichlorosilane, HSiCl$_3$. In a like manner under the teachings of our invention, the substituted chlorosilanes may be disproportionated so long as such molecules contain at least one hydrogen atom bonded to a silicon atom. For example, an alkyldichlorosilane disproportionates to the alkyltrichlorosilane and the alkylmonochlorosilane. The redistribution of atoms which occurs when disproportionating a substituted chlorosilane is limited solely to a rearrangement of those hydrogen and chlorine atoms bonded to silicon. The substituent group or groups bonded to the silicon atom of a chlorosilane are not affected by the process of our invention.

Disproportionation is effected in accordance with the present invention by treating the chlorosilane with a nitrile catalyst. The amount of catalyst employed is not critical and, therefore, from about 1% to about 15% by weight of the chlorosilane may be used. The preferred range, however, varies from about 1% to about 5% by weight of the chlorosilane.

In the preferred embodiment of our invention, the chlorosilane is treated with the nitrile catalyst at temperatures ranging from 150° to 200° C. Temperatures greater than 200° C. may be employed; however, when employing such temperatures the catalyst oftentimes decomposes and lose their catalytic activity.

The redistribution effected by the disproportionation of chlorosilanes conducted in accordance with the present invention may be represented by the following equation:

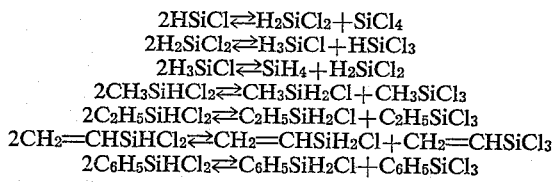

wherein R may be alkyl, aryl, chlorine or hydrogen.

Representative examples of the effected rearrangement are depicted by the following equations wherein trichlorosilane, dichlorosilane, monochlorosilane, methyldichlorosilane, ethyldichlorosilane, vinyldichlorosilane, and phenyldichlorosilane are disproportionated:

$$2HSiCl_3 \rightleftarrows H_2SiCl_2 + SiCl_4$$
$$2H_2SiCl_2 \rightleftarrows H_3SiCl + HSiCl_3$$
$$2H_3SiCl \rightleftarrows SiH_4 + H_2SiCl_2$$
$$2CH_3SiHCl_2 \rightleftarrows CH_3SiH_2Cl + CH_3SiCl_3$$
$$2C_2H_5SiHCl_2 \rightleftarrows C_2H_5SiH_2Cl + C_2H_5SiCl_3$$
$$2CH_2=CHSiHCl_2 \rightleftarrows CH_2=CHSiH_2Cl + CH_2=CHSiCl_3$$
$$2C_6H_5SiHCl_2 \rightleftarrows C_6H_5SiH_2Cl + C_6H_5SiCl_3$$

Thus, the general effect of the disproportionation of a given chlorosilane is to form two different chlorosilanes, one of which contains more chlorine atoms and fewer hydrogen atoms bonded to silicon than the starting material, and the other of which contains fewer chlorine atoms and more hydrogen atoms bonded to silicon than the starting chlorosilane.

The process of our invention may be conducted by any suitable method. However, as we prefer to employ temperatures from 150° C. to 200° C. and as the boiling points of many chlorosilanes are below 150° C., it will be convenient to conduct the reaction either in an autoclave or by continuously passing vapors of the chlorosilane over a bed of the catalyst. Whenever chlorosilanes having boiling points above the preferred temperatures are disproportionated, it will be possible to conduct the reaction at atmospheric pressure.

As is evident from the above equations, the disproportionation reactions are in chemical equilibria and, therefore, the products of such reactions are present in the reaction mixture in amounts determined by the equilibrium constants for the reactions. In those instances where disproportionations can be conducted at atmospheric pressure, yields greater than the equilibrium amounts may be obtained by conducting the disproportionation reaction at the boiling temperature of the reaction mixture under conditions of partial reflux. By so doing, the lower boiling of the chlorosilanes formed in the disproportionation will distill, thus causing the reaction to proceed toward completion with increased yields. Normally, the reaction is conducted in a flask connected to a fractionating column so that the lower boiling chlorosilanes may be readily collected.

When employing the process of our invention to disproportionate a chlorosilane having a boiling point below 150° C., we prefer to conduct the reaction in a pressure vessel, for example, a rocking autoclave. In such instances, the procedure followed comprised charging a chlorosilane and an appropriate catalyst to the vessel, the vessel prior to sealing by purging with dry nitrogen or hydrogen gas. Heating was continued for a period at sealing and applying heat thereto. Air was excluded from a constant temperature within the range of from 150° to 200° C., after which period the vessel was cooled to room temperature, opened, and the contents removed for analysis. Generally, identification was accomplished by distillation and infrared analysis.

Of the nitrile catalysts which may be employed in our invention, we prefer the acyclic nitriles. Examples of such catalysts include hydrogen cyanide, acetonitrile, adiponitrile, polyacrylonitrile, and others. Our catalysts, as indicated above, are employed in amounts varying from 1% to 15% by weight of the chlorosilane. Amounts of the catalyst in excess of 15% may be employed; however, such excess amounts have been found not to materially increase the yield of the reaction.

The table below comprises a tabulated account of disproportionations conducted in accordance with the present invention. In each instance, trichlorosilane, the compound disproportionated, was charged to an electrically heated autoclave with a catalyst and heated to a temperature between 150° and 200° C. Specifically noted in the table are the amounts of trichlorosilane and catalyst initially charged, temperature, and period of heating, and the product, together with the amount thereof.

TABLE I

| $HSiCl_3$ (moles) | Catalyst | | Temp. (° C.) | Time (hr.) | Product, mole percent, of $H_2SiCl_2$ in reaction mixture |
|---|---|---|---|---|---|
| | Moles | Compound | | | |
| 2.0 | 0.1 | Hydrogen cyanide | 200 | 0.25 | 6.3 |
| 2.0 | 0.02 | Acetonitrile | 200 | 2 | 6.1 |
| 2.0 | 5 g. | Polyacrylonitrile | 200 | 0.25 | 5.0 |
| 2.0 | 0.036 | Succinonitrile | 200 | 0.5 | 4.6 |
| 2.0 | 0.04 | Glutaronitrile | 200 | 0.25 | 7.2 |
| 2.0 | 0.018 | Adiponitrile | 200 | 0.25 | 14.0 |
| 2.0 | 0.03 | Pimelonitrile | 200 | 0.25 | 14.1 |
| 2.0 | 0.03 | Azelaionitrile | 200 | 0.25 | 6.5 |
| 2.0 | 0.03 | Sebaconitrile | 200 | 0.25 | 4.0 |
| 2.0 | 0.03 | Suberonitrile | 200 | 0.25 | 4.0 |

In addition to trichlorosilane, other chlorosilanes may be disproportionated in accordance with our invention. Such disproportionation is effected by merely following the procedure outlined for trichlorosilane. The following table discloses examples of such disproportionations.

TABLE II

| Compound | Catalyst (Wt. Percent) | Temp. (° C.) | Product Composition (Mole Percent) |
|---|---|---|---|
| 200 g. $H_2SiCl_2$ | 2% Adiponitrile | 200 | 15.5% $H_3SiCl$. 59.2% $H_2SiCl_2$. 25.2% $HSiCl_3$. |
| 200 g. $H_2SiCl_2$ | do | 175 | 28.7% $H_3SiCl$. 51.8% $H_2SiCl_2$. 20.7% $HSiCl_3$. |
| 80 g. $C_2H_5SiHCl_2$ | 15% Adiponitrile | 200 | 13.8% $C_2H_5SiH_2Cl$. 63.5% $C_2H_5SiHCl_2$. 17.3% $C_2H_5SiCl_3$. |

When disproportionating a chlorosilane having a boiling point above the temperatures generally employed, that is, 150° to 200° C., we may, as previously indicated, conduct the reaction at atmospheric pressure and obtain yields greater than the equilibrium amounts by distilling off the lower boiling chlorosilane formed. The aromatic chlorosilanes, for example, phenyldichlorosilane, have boiling points above 150° C., and therefore they may be disproportionated at atmospheric pressure. The procedure employed comprised placing phenyldichlorosilane and a nitrile catalyst in a flask connected to a fractionating column and heating to the reflux temperature of the reaction mixture, generally 170° to 190° C. The lower boiling product, phenylmonochlorosilane, was evolved and collected.

In the table below there appears the data obtained in two disproportionations conducted at atmospheric pressure.

TABLE III

*Disproportionation of chlorosilanes at atmospheric pressure*

| Compound | Catalyst | Product |
|---|---|---|
| 154 g. $C_6H_5SiHCl_2$ | 4 g. Adiponitrile | 38 g. $C_6H_5SiH_2Cl$. 76.1 g. $C_6H_5SiCl_3$. |
| 12,124 g. $C_6H_5SiHCl_2$ | 15 g. Adiponitrile | 315 g. $C_6H_5SiH_2Cl$. 603 g. $C_6H_5SiCl_3$. |

A unique aspect of the present invention lies in the ability of the catalyst to lend itself toward increasing activity. For example, it has been found that if a chlorosilane is treated with a nitrile catalyst in a metal autoclave at a temperature of about 150° or more and the reaction products placed in a flask and all of the low-boiling compounds distilled off, there remains a high-boiling mixture of the catalyst and chlorosilane. This high-boiling mixture comprises an activated catalyst. The increased activity of these catalysts is readily appreciated, as disproportionations employing such catalysts are normally conducted at greatly reduced temperatures.

As hereinbefore noted, disproportionations conducted with normal or unactivated catalysts are preferably conducted at temperatures of at least 150° C. and, as such temperatures are above the boiling points of many chlorosilanes, it is generally necessary to carry out the reaction in an autoclave. By employing an activated catalyst, disproportionation will occur at temperatures below 100° C. and usually from about 30° C. to about 60° C. Such temperatures are generally below the boiling points of the normally liquid chlorosilanes and, therefore, it will be convenient to conduct the reaction at atmospheric pressures and at reflux temperatures. By employing this method, the lower boiling product will evolve from the reaction mixture, thus causing the reaction to proceed toward completion with increased yields.

It is apparent that an activated catalyst may be prepared as a product of a disproportionation reaction. For example, ethyldichlorosilane may be disproportionated by employing adiponitrile as the catalyst by merely placing the chlorosilane and catalyst in a closed pressure vessel and heating to at least 150° C. The reaction mixture may then be placed in a flask connected to a distillation column, heat applied, and ethylmonochlorosilane distilled off. Heating is continued after the maximum amount of ethylmonochlorosilane is obtained to drive off other low-boiling compounds which may be present in the reaction mixture. The remaining high-boiling mixture of ethyldichlorosilane and adiponitrile comprises an activated catalyst which may be employed in subsequent disproportionations whether at atmospheric or at increased pressures.

Activated catalysts may be employed in a number of subsequent disproportionations without loss in their catalytic effect. All that is required is the removal from the reaction mixture of the desired product as well as the lower-boiling materials which may also be present. Thus, the activated catalyst prepared in the above adiponitrile and chlorosilane reaction conducted under pressure may be employed, if desired, for two, three, or more disproportionations.

Activation of the catalysts of our invention may be accomplished by treatment with any chlorosilane. Examples of such chlorosilanes are ethyldichlorosilane, phenyldichlorosilane, and others. The table below discloses the results of several disproportionations conducted at atmospheric pressure, of ethyldichlorosilane with an activated catalyst. In each instance the catalyst was prepared by heating a nitrile with a chlorosilane in a pressure vessel at a temperature above 150° C. The lower-boiling materials were distilled from the reaction mass and the high-boiling remaining product was employed as the catalyst.

TABLE IV

| $C_2H_5SiHCl_2$ (grams) | Catalyst | Time (hr.) | Yield of $C_2H_5SiH_2Cl$ (grams) |
|---|---|---|---|
| 208 | High-boiling product remaining after reacting 5 g. Adiponitrile and 208 g. $C_2H_5SiHCl_2$ at 200° C. | 20 | 55 |
| 72 | 24 g. of high-boiling product remaining after reacting 10 g. Adiponitrile and 65 g. $C_2H_5SiHCl_2$ at 300° C. | 5 | 12.5 |

To illustrate the continuing life of our catalysts, we employed the high-boiling remaining product of the first disproportionation reported in Table IV as a disproportionating catalyst in another reaction. After the 55 grams of ethylmonochlorosilane were obtained, we continued heating the reaction mixture, which originally comprised 208 grams ethyldichlorosilane and the high-boiling remaining product from the adiponitrile and ethyldichlorosilane reaction, until all the lower-boiling products were removed. Twenty-six and one-half (26.5) grams of the high-boiling remaining product were then employed to disproportionate 305 grams of ethyldichlorosilane at atmospheric pressure and at reflux temperature. The results of the original and subsequent disproportionations are disclosed in the table below.

TABLE V

| | $C_2H_5SiCHl_2$ (grams) | Catalyst | Time (hr.) | Yield of $C_2H_5SiH_2Cl$ (grams) |
|---|---|---|---|---|
| 1 | 208 | High-boiling product remaining after reacting 5 g. Adiponitrile and 208 g. $C_2H_5SiHCl_2$ at 200° C. | 20 | 55 |
| 2 | 305 | 26.5 g. of high-boiling remaining product from 1. | 24 | 20 |

The above examples disclose the disproportionation of various chlorosilanes and it is to be understood the present invention is not limited to the specific examples disclosed, but instead that it is applicable to the disproportionation of all aliphatic and aromatic chlorosilanes so long as there is at least one hydrogen atom bonded to the silicon atom. Furthermore, it is to be understood that all nitriles as well as those nitriles activated in the manner described above may be employed as disproportionation catalysts, the examples disclosed serving only as representative catalysts.

We claim:

1. A process of disproportionating a chlorosilane containing at least one hydrogen to silicon bond which comprises treating said silane with a catalyst taken from the group consisting of acyclic hydrocarbyl nitriles and hydrogen cyanide and recovering two different silane compounds, one of which contains more hydrogen atoms and fewer chlorine atoms attached to silicon than the starting chlorosilane, and the other contains more chlorine atoms and fewer hydrogen atoms attached to silicon than the starting chlorosilane.

2. A process of disproportionating a chlorosilane containing at least one hydrogen to silicon bond which comprises treating said silane with an acyclic hydrocarbyl nitrile catalyst and recovering two different silane compounds, one of which contains more hydrogen atoms and fewer chlorine atoms attached to silicon than the starting chlorosilane, and the other contains more chlorine atoms and fewer hydrogen atoms attached to silicon than the starting chlorosilane.

3. A process of disproportionating a chlorosilane containing at least one hydrogen to silicon bond which comprises treating said silane with an acryclic hydrocarbyl dinitrile catalyst and recovering two different silane compounds, one of which contains more hydrogen atoms and fewer chlorine atoms attached to silicon than the starting chlorosilane, and the other contains more chlorine atoms and fewer hydrogen atoms attached to silicon than the starting chlorosilane.

4. A process of disproportionating a chlorosilane containing at least one hydrogen to silicon bond which comprises treating said silane with an alkylene dinitrile catalyst and recovering two different silane compounds, one of which contains more hydrogen atoms and fewer chlorine atoms attached to silicon than the starting chlorosilane, and the other contains more chlorine atoms and fewer hydrogen atoms attached to silicon than the starting chlorosilane.

5. A process of disproportionating a chlorosilane containing only hydrogen and chlorine atoms bonded to silicon which comprises treating said silane with an acyclic hydrocarbyl dinitrile catalyst and recovering two different silane compounds, one of which contains more hydrogen atoms and fewer chlorine atoms attached to silicon than the starting chlorosilane, and the other contains more chlorine atoms and fewer hydrogen atoms attached to silicon than the starting chlorosilane.

6. A process of disproportionating a chlorosilane containing only hydrogen and chlorine atoms bonded to silicon which comprises treating said silane with an alkylene dinitrile catalyst and recovering two different silane compounds, one of which contains more hydrogen atoms and fewer chlorine atoms attached to silicon than the starting chlorosilane, and the other contains more chlorine atoms and fewer hydrogen atoms attached to silicon than the starting chlorosilane.

7. A process of disproportionating a hydrocarbyl substituted chlorosilane containing at least one hydrogen to silicon bond which comprises treating said silane with an alkylene dinitrile catalyst and recovering two different silane compounds, one of which contains more hydrogen atoms and fewer chlorine atoms attached to silicon than the starting chlorosilane, and the other contains more chlorine atoms and fewer hydrogen atoms attached to silicon than the starting chlorosilane.

8. A process of disproportionating an alkyl chlorosilane containing at least one hydrogen to silicon bond which comprises treating said silane with an alkylene dinitrile catalyst and recovering two different silane compounds, one of which contains more hydrogen atoms and fewer chlorine atoms attached to silicon than the starting chlorosilane, and the other contains more chlorine atoms and fewer hydrogen atoms attached to silicon than the starting chlorosilane.

9. A process of disproportionating an aryl chlorosilane containing at least one hydrogen to silicon bond which comprises treating said silane with an alkylene dinitrile catalyst and recovering two different silane compounds, one of which contains more hydrogen atoms and fewer chlorine atoms attached to silicon than the starting chlorosilane, and the other contains more chlorine atoms and fewer hydrogen atoms attached to silicon than the starting chlorosilane.

10. A process of disproportionating a chlorosilane containing at least one hydrogen to silicon bond which comprises treating said silane with an acyclic hydrocarbyl nitrile catalyst at a temperature of about 150° C. to about 200° C. and recovering two different silane compounds, one of which contains more hydrogen atoms and fewer chlorine atoms attached to silicon than the starting chlorosilane, and the other contains more chlorine atoms and fewer hydrogen atoms attached to silicon than the starting chlorosilane.

11. A process of disproportionating a chlorosilane containing at least one hydrogen to silicon bond which comprises treating the said silane with a catalyst consisting of a high-boiling product obtained by heating an acyclic hydrocarbyl nitrile with an alkyl chlorosilane and recovering two different silane compounds, one of which contains more hydrogen atoms and fewer chlorine atoms attached to silicon than the starting chlorosilane, and the other contains more chlorine atoms and fewer hydrogen atoms attached to silicon than the starting chlorosilane.

12. A process of disproportionating trichlorosilane which comprises treating said silane with an alkylene dinitrile catalyst and recovering dichlorosilane and silicon tetrachloride.

13. A process for disproportionating dichlorosilane which comprises treating said silane with an alkylene dinitrile catalyst and recovering monochlorosilane and trichlorosilane.

14. A process of disproportionating trichlorosilane which comprises treating said silane with hydrogen cyanide at a temperature from about 150° C. to about 200° C.

15. A process of disproportionating trichlorosilane which comprises treating said silane with adiponitrile at a temperature of from about 150° C. to about 200° C.

16. A process of disproportionating trichlorosilane which comprises treating said silane with pimelonitrile at a temperature of from about 150° C. to about 200° C.

17. A process of disproportionating dichlorosilane which comprises treating said silane with adiponitrile at a temperature of from about 150° C. to about 200° C.

18. A process of disproportionating phenyldichlorosilane which comprises treating said silane with adiponitrile at a temperature of from about 150° C. to about 200° C. and recovering phenyltrichlorosilane and phenylmonochlorosilane.

19. A process of disproportionating a chlorosilane containing at least one hydrogen to silicon bond which comprises treating said silane with a catalyst consisting of a high-boiling product obtained by heating an acyclic hydrocarbyl nitrile with a chlorosilane and recovering two different silane compounds, one of which contains more hydrogen atoms and fewer chlorine atoms attached to silicon than the starting chlorosilane, and the other contains more chlorine atoms and fewer hydrogen atoms attached to silicon than the starting chlorosilane.

20. A process of disproportionating a chlorosilane containing at least one hydrogen to silicon bond which comprises treating said silane with from about 1 per cent to about 5 per cent by weight of an acyclic hydrocarbyl nitrile catalyst and recovering two different silane compounds, one of which contains more hydrogen atoms and fewer chlorine atoms attached to silicon than the starting chlorosilane, and the other contains more chlorine atoms and fewer hydrogen atoms attached to silicon than the starting chlorosilane.

21. A process of disproportionating a chlorosilane containing at least one hydrogen to silicon bond which comprises treating the said silane with from about 1 per cent to about 5 per cent by weight of an acyclic hydrocarbyl nitrile catalyst at a temperature of from about 150° C. to about 200° C. and recovering two different silane compounds, one of which contains more hydrogen atoms and fewer chlorine atoms attached to silicon than the starting chlorosilane, and the other contains more chlorine atoms and fewer hydrogen atoms attached to silicon than the starting chlorosilane.

References Cited in the file of this patent

FOREIGN PATENTS 663,810     Great Britain _____ Dec. 27, 1951

OTHER REFERENCES

Sauer et al.: Jour. Am. Chem. Soc., vol. 70 (1948), pages 3590–3596.